US008933790B2

(12) United States Patent
Oung et al.

(10) Patent No.: US 8,933,790 B2
(45) Date of Patent: Jan. 13, 2015

(54) PHASE COUPLER FOR ROTATING FIELDS

(75) Inventors: Harry Oung, Cherry Hill, NJ (US); Kefeng Zeng, Mantua, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 1069 days.

(21) Appl. No.: 12/433,375

(22) Filed: Apr. 30, 2009

(65) Prior Publication Data

US 2009/0261976 A1 Oct. 22, 2009

Related U.S. Application Data

(63) Continuation-in-part of application No. 12/134,827, filed on Jun. 6, 2008, now Pat. No. 8,587,489.

(60) Provisional application No. 60/942,873, filed on Jun. 8, 2007.

(51) Int. Cl.

| | |
|---|---|
| ***H04Q 5/22*** | (2006.01) |
| ***H01Q 1/22*** | (2006.01) |
| ***G08B 13/24*** | (2006.01) |
| ***H01Q 3/26*** | (2006.01) |
| ***H01Q 7/00*** | (2006.01) |
| ***H01Q 7/06*** | (2006.01) |

(52) U.S. Cl.
CPC .......... *H01Q 1/2216* (2013.01); *G08B 13/2471* (2013.01); *G08B 13/2474* (2013.01); *G08B 13/2477* (2013.01); *H01Q 3/26* (2013.01); *H01Q 7/00* (2013.01); *H01Q 7/06* (2013.01)
USPC ........ 340/10.4; 340/572.7; 343/742; 343/867

(58) Field of Classification Search
CPC ............ G06K 7/0008; G06K 19/0723; G06K 19/07749
USPC ........................................................ 340/10.4
See application file for complete search history.

(56) References Cited

U.S. PATENT DOCUMENTS

| | | | |
|---|---|---|---|
| 3,673,517 | A | 6/1972 | Ticknor |
| 4,016,553 | A | 4/1977 | Novikoff et al. |

(Continued)

FOREIGN PATENT DOCUMENTS

| | | |
|---|---|---|
| EP | 0186483 | 7/1986 |
| EP | 0579332 | 1/1994 |

(Continued)

OTHER PUBLICATIONS

International Search Report for Corresponding PCT Application No. PCT/US2009/055332 dated Feb. 11, 2010.

*Primary Examiner* — George Bugg
*Assistant Examiner* — Anthony D Afrifa-Kyei
(74) *Attorney, Agent, or Firm* — Richard A. Howe, II

(57) ABSTRACT

This invention relates to dynamically controlled, electronic article surveillance (EAS) systems whereby an array of antenna elements is digitally phased and actively driven for concurrent transmission, and digitally phased and combined in the receiver unit to improve detection. In particular, the individual frequency and phase of the plurality of the transmit/receive signals are rapidly varied to allow for automated manipulation (steering) of the transmit field pattern and receive field sensitivity. The invention achieves the following features via means of digital phasing and dynamic computer control: sufficient far-field cancellation, null-free detection and uncompromised detection performance regardless of tag's orientation while using single transmission drivers to drive entire antenna structures, whether loop antenna or ferrite core antenna, using a phase coupler, thereby allowing more efficient system operation or additional features such as deactivator antenna operation.

11 Claims, 25 Drawing Sheets

(56) References Cited

U.S. PATENT DOCUMENTS

| | | | |
|---|---|---|---|
| 4,063,229 A | 12/1977 | Welsh et al. | |
| 4,135,183 A | 1/1979 | Heltemes | |
| 4,243,980 A | 1/1981 | Lichtblau | |
| 4,260,990 A | 4/1981 | Lichtblau | |
| 4,373,163 A | 2/1983 | Vandebult | |
| 4,438,437 A * | 3/1984 | Burgmyer | 343/770 |
| 4,679,046 A | 7/1987 | Curtis et al. | |
| 4,866,455 A | 9/1989 | Lichtblau | |
| 5,049,857 A | 9/1991 | Plonsky et al. | |
| 5,430,511 A | 7/1995 | Paff et al. | |
| 5,764,187 A | 6/1998 | Rudish et al. | |
| 5,907,221 A * | 5/1999 | Sato et al. | 315/111.51 |
| 6,020,856 A | 2/2000 | Alicot | |
| 6,060,988 A * | 5/2000 | Copeland et al. | 340/572.1 |
| 6,081,238 A | 6/2000 | Alicot | |
| 6,166,706 A * | 12/2000 | Gallagher et al. | 343/867 |
| 6,388,628 B1 | 5/2002 | Dettloff et al. | |
| 6,517,000 B1 * | 2/2003 | McAllister et al. | 235/462.01 |
| 6,578,202 B1 | 6/2003 | Holland | |
| 6,603,391 B1 * | 8/2003 | Greeff et al. | 340/10.3 |
| 6,700,490 B2 | 3/2004 | Frederick | |
| 6,836,216 B2 | 12/2004 | Manov et al. | |
| 7,183,922 B2 * | 2/2007 | Mendolia et al. | 340/572.1 |
| 7,301,459 B2 | 11/2007 | Frederick et al. | |
| 7,317,426 B2 | 1/2008 | Copeland et al. | |
| 7,420,463 B2 | 9/2008 | Copeland et al. | |
| 2001/0038332 A1 * | 11/2001 | Rodgers et al. | 340/572.1 |
| 2002/0084940 A1 * | 7/2002 | Dettloff et al. | 343/742 |
| 2002/0157070 A1 | 10/2002 | Embling et al. | |
| 2003/0210145 A1 * | 11/2003 | Manov et al. | 340/572.4 |
| 2005/0001779 A1 * | 1/2005 | Copeland et al. | 343/867 |
| 2005/0253720 A1 | 11/2005 | Oakes et al. | |
| 2006/0132312 A1 | 6/2006 | Tavormina | |
| 2008/0014790 A1 | 1/2008 | Montena | |
| 2008/0303673 A1 | 12/2008 | Oung et al. | |

FOREIGN PATENT DOCUMENTS

| | | |
|---|---|---|
| EP | 0608961 | 8/1994 |
| EP | 0628937 | 12/1994 |
| EP | 0645840 | 3/1995 |
| EP | 0663657 | 7/1995 |
| EP | 1041503 | 10/2000 |
| EP | 1128464 | 8/2001 |
| EP | 1357635 | 10/2003 |
| EP | 1602939 | 12/2005 |
| EP | 1693778 | 8/2006 |
| EP | 1727235 | 11/2006 |
| EP | 1596346 | 7/2008 |
| WO | 2005119615 | 12/2005 |
| WO | 2008/154404 | 12/2008 |

* cited by examiner

PHASE COUPLER FOR ROTATING FIELDS

CROSS-REFERENCE TO RELATED APPLICATIONS

This Continuation-in-Part application claims the benefit under 35 U.S.C. §120 of application Ser. No. 12/134,827 filed on Jun. 6, 2008 entitled DYNAMIC EAS DETECTION SYSTEM AND METHOD which in turn claims the benefit under 35 U.S.C. §119(e) of Provisional Application Ser. No. 60/942,873 filed on Jun. 8, 2007 entitled DYNAMIC EAS DETECTION and all of whose entire disclosures are incorporated by reference herein.

BACKGROUND OF THE INVENTION

1. Field of Invention

This invention relates to dynamically controlled, digitally-phased, multiple antenna elements for generating a dynamically enhanced electromagnetic field for orientation-independent tag detection and digital synthesis techniques which improves signal sensitivity of electronic article surveillance (EAS) systems.

2. Description of Related Art

An electronic article surveillance (EAS) system typically consists of (a) tags, (b) interrogation antenna(s), and (c) interrogation electronics, each playing a specific role in the overall system performance.

An EAS loop antenna pedestal(s) is typically installed near the exit of a retail store and would alarm upon the unauthorized removal of an article from the store, based on the detection of a resonating tag secured to the article. The system comprises a transmitter unit for generating an electromagnetic field adjacent to the pedestal, and a receiver unit for detecting the signal caused by the presence of the resonating tag in the interrogating field.

Some desired features in EAS include: no blind spot or null region exists in the detection zone; the interrogating field be sufficiently strong near the antenna for detecting the presence of a resonating tag in noisy environments, but sufficiently weak far away for regulatory compliance, and that the detection performance be unaffected by the orientation of the resonating tag.

One approach to suppress far field emission is to mechanically twist an O-loop antenna 180° in the middle to form an 8-loop. However, a detection null is created in the area near the intersection of the figure eight crossover due to the magnetic field lines running in parallel to the plane of the tag. This causes significantly reduced detection as optimal detection is achieved when the magnetic field lines run perpendicular to the plane of the tag.

Another approach, EP 0 186 483 (Curtis et al.), utilizes an antenna system that includes a first O-loop antenna and a second 8-loop antenna which is coplanar to the first. In such an arrangement, a circular-polarized, interrogating field is created when both antennas are driven concurrently with a phase shift such that the energy received by the tag is the same regardless of its orientation.

A different antenna structure, disclosed in EP 0 579 332 (Rebers), comprises two-loop antenna coils, wherein one coil is part of a series resonance circuit and the other coil is part of a parallel resonance circuit; the series and parallel resonance circuits are interconnected to form an analog phase-shift network which is driven by a single power source.

An equivalent analog phase-shift network is incorporated in EP 1 041 503 (Kip) that relates to a phase insensitive receiver for use in a rotary emission field.

Another approach, U.S. Pat. No. 6,166,706 (Gallagher III, et al.), generates a rotating field comprising a magnetically coupled center loop located coplanar to an electrically driven 8-loop while overlapping a portion or both of the upper and lower 8-loops. With this antenna configuration, magnetic induction produces a 90° phase difference between the phase of the 8-loop and the phase of the center loop such that a rotary field is created.

In U.S. Pat. No. 6,836,216 (Manov, et al.), the direction of current flow in four antenna coils is separately controlled to generate a resultant magnetic field that is polarized in some preferred orientations (vertical, perpendicular, or parallel to the exit aisle) within the interrogation zone.

A plurality of antenna configurations is described in U.S. Pat. No. 6,081,238 (Alicot) whereby the antennas are phased 90° apart from each other to improve the interrogating field distribution.

All EAS systems utilize resonance effects, such as magnetoelastic resonance (e.g., acoustomagnetostrictive or AM) and electromagnetic resonance (RF coil tag). EAS tags exhibit a second-order response to an applied excitation, and the resonance behavior is mathematically described by an impulse response in time-domain and a frequency response in frequency-domain. The impulse response and frequency response from a Fourier transform pair that provides two alternative means of tag interrogation: pulse-listen interrogation and swept-frequency interrogation.

EAS antennas are electrically small when compared to the wavelength at the operating frequency, typically below 10 MHz, and the interrogation zone which is within the near-field region, where the inductive coupling dominates. Planar loops are most commonly used because of its simplicity and low cost. Tag excitation requires the magnetic flux to be substantially tangential to the length of an AM tag and perpendicular to an inductive coil tag. A single antenna loop element inevitably generates an uneven interrogation zone with respect to tag position and orientation. In practice, at least two antenna elements are used to switch the field direction, thus creating a more uniform interrogation zone.

Previous solutions to the orientation problem include either simultaneously phasing or sequentially alternating multiple antenna elements.

EP 0 186 483 (Curtis, et al.) discloses an antenna structure (see FIG. 1) comprising a figure-8 loop (or 2-loop) element 11 and an O-loop (or 1-loop) element 12 that, when driven 90° out of phase, generates a constantly rotating field. Curtis's antenna structure is not well balanced, as the O loop generates a significantly larger field than the figure-8 loop.

EP 0 645 840 (Rebers) proposes an improved structure (see FIG. 2) that uses 2-loop element 14 and a 3-loop element 13. The 3-loop also has an advantage over the 1-loop (of FIG. 1) in terms of far-field cancellation, although it was not a concern in both Curtis's and EP 0 645 840 (Rebers) inventions. For continuous transmission where the received signal is in the form of modulation on the carrier signal, the phase of the received signal is sensitive to tag orientation. Synchronous demodulation, or phase-sensitive detection, will not work well with a rotating field that in effect constantly rotates the tag. Quadrature receiver calculation is required to eliminate the phase-sensitivity.

EP 1 041 503 (Kip) discloses a receiver (see FIG. 3) that addresses the phase-sensitivity issue.

U.S. Pat. No. 6,081,238 (Alicot) discloses an antenna structure (see FIG. 4) that uses two adjacent coplanar single loops, where the mutual coupling introduces a phase-shift of 90°, thus creating a relatively null-free detection pattern. A practical issue with the phase-shift by means of mutual coupling is that it requires a high Q to induce 90° of phase shift between the two loops, leading to excessive ringing for pulse-listen interrogation. Also, the induced current on the coupling loop will not have as large amplitude as the current on the feeding loop, and the detection pattern will not be uniform for the two loops.

Disclosed in the same patent is a practical implementation (see FIG. 5) that alternates phase difference (either in phase or out of phase) between the two loops to switch field direction. The received signals from the two loops are shifted 90° for subsequent mixing. When the two antenna loops are in phase (during time interval A as shown in FIG. 6), there is no far-field cancellation.

Disclosed in the same patent is a solution by dividing the single loop into four equal-area elements assigned with phase of 0°, 90°, 180°, and 270°, as shown in FIG. 7.

The aforesaid methods and implementations have their specific issues and limitations. Curtis ignores the receiver and far-field cancellation. EP 0 579 332 (Rebers) uses an RC phase-shifting circuit that not only introduces insertion loss but also causes resonance problems if used in a pulse-listen system. Also, an RC phase-shifting circuit may not work well across a frequency range due to its limited bandwidth. For a pulse-listen system, it is simpler to sequentially alternate the 2-loop and 3-loop in terms of transmission and receiving. Alicot also uses a phase-shifting circuit for quadrature receiver. As for far-field cancellation, Alicot divides the single loop into four equal-area elements. As detection performance is largely dependent upon the size of each loop element, the four-element antenna with far-field cancellation will have reduced detection compared to the two-element antenna without far-field cancellation.

All references cited herein are incorporated herein by reference in their entireties.

BRIEF SUMMARY OF THE INVENTION

It is the object of this invention to eliminate the analog phase-shifting circuit for both transmission and receiving, thus eliminating the insertion loss and hence improving the signal-to-noise ratio. The received signals from each antenna elements are digitized or processed using appropriate digital processing techniques.

Another object of this invention to increase the size of the antenna element while achieving substantial far-field cancellation for regulatory compliance.

For two elements driven 90° out of phase, the vector summation is not zero in far field, as shown in FIG. 8, and an additional far field cancellation technique is required.

An improved phasing method, of the present invention, are three antenna elements that, when driven 120° out of phase, result in zero vector summation in far field, as shown in FIG. 9.

An electronic article surveillance system is provided which comprises an antenna structure including three or more loops each connected to an independent transmission driver for generating a corresponding electromagnetic field wherein the transmission drivers are arranged to drive the loops in such a way that a vector sum of the electromagnetic fields of the independent transmission drivers is null in a far field and wherein no vector is separated from another vector by 180° of phase.

A dynamically controlled electronic article surveillance system for detecting security tags is provided wherein an array of antenna elements is digitally phased and actively driven for concurrent transmission to generate a plurality of electromagnetic fields having respective vectors and wherein the system changes the phases between each of the vectors for interacting with security tags for effecting tag detection.

An electronic article surveillance system comprising a plurality of antenna structures, wherein each antenna structure includes three or more loops and wherein each antenna structure is connected to a single transmission driver. The transmission drivers are arranged to drive the loops of the antenna structure in such a way that the vector sum of the electromagnetic fields of the transmission drivers is null in a far field and wherein no vector is separated by another vector by 180° of phase.

An electronic article surveillance system comprising a plurality of antenna structures, wherein each antenna structure includes three or more loops which are wound around an electromagnetic core structure and wherein each antenna structure is connected to a single transmission driver. The transmission drivers are arranged to drive the loops wound around said electromagnetic core structure of the antenna structure in such a way that the vector sum of the electromagnetic fields of the transmission drivers is null in a far field and wherein no vector is separated from another by 180° of phase.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
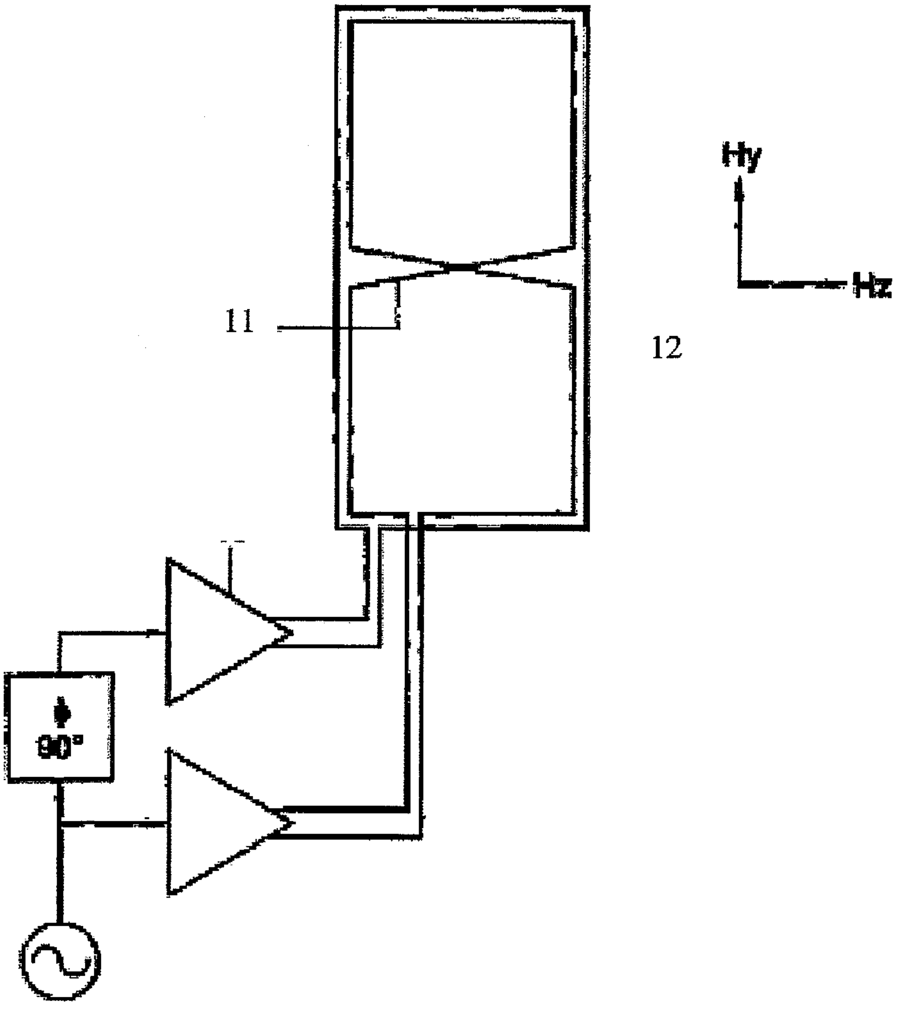
Fig. 1 (prior art)
FIG. 1 is a prior art antenna structure as depicted in EP 0 186 483 (Curtis)
Figure 2:
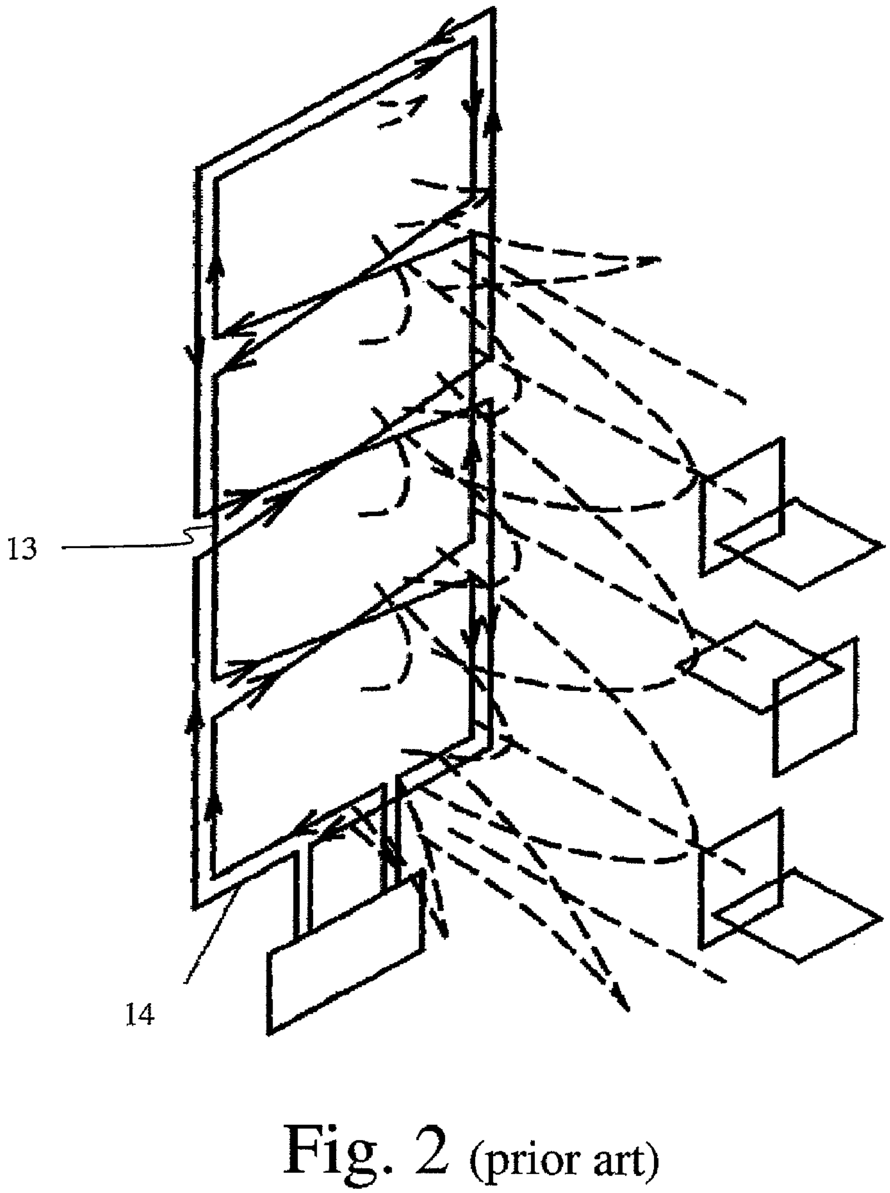
Fig. 2 (prior art)
FIG. 2 is another prior art antenna structure as depicted in EP 0 645 840 (Rebers)
Figure 3:
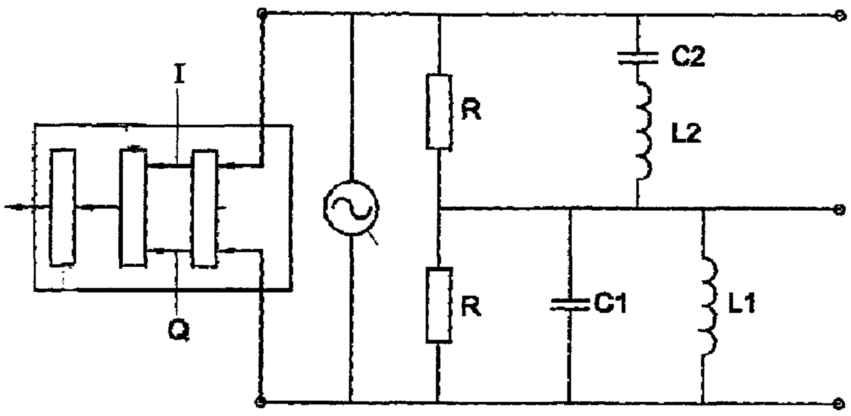
Fig. 3 (prior art)
FIG. 3 is a prior art receiver as depicted in EP 1 041 503 (Kip)
Figure 4:
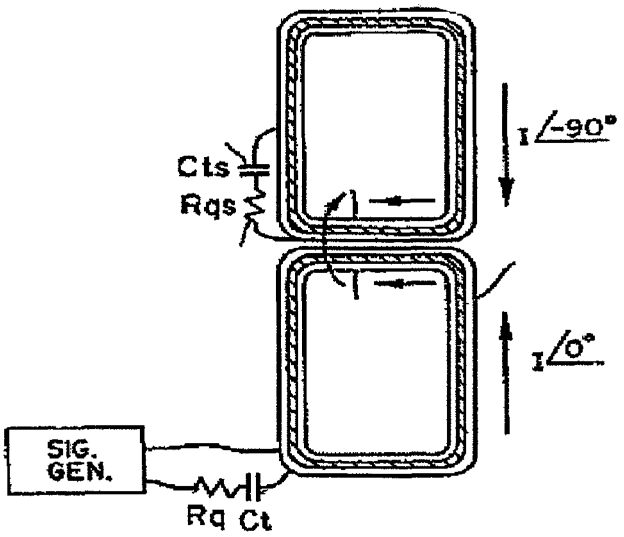
Fig. 4 (prior art)
FIG. 4 is another prior art antenna structure as depicted in U.S. Pat. No. 6,081,238 (Alicot)
Figure 5:
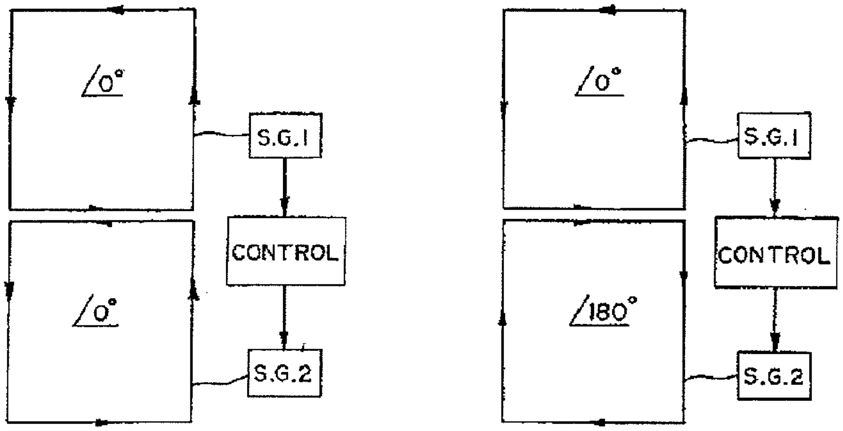
Fig. 5 (prior art)
FIG. 5 is a functional diagram of the antenna structure of FIG. 4.
Figure 6:
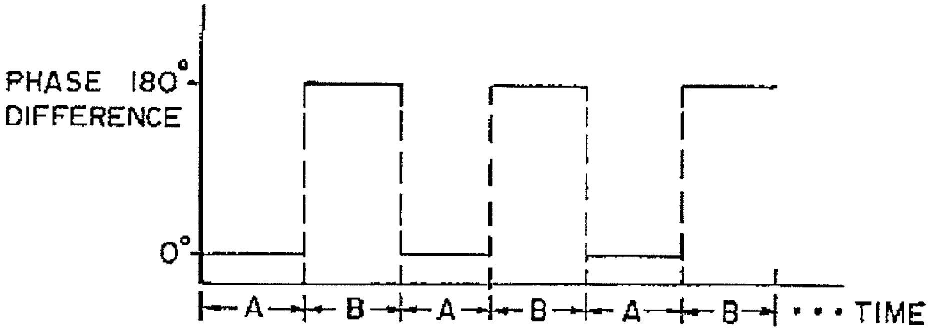
Fig. 6 (prior art)
FIG. 6 is a timing diagram for activating the antenna structure of FIGS. 4-5.
Figure 7:
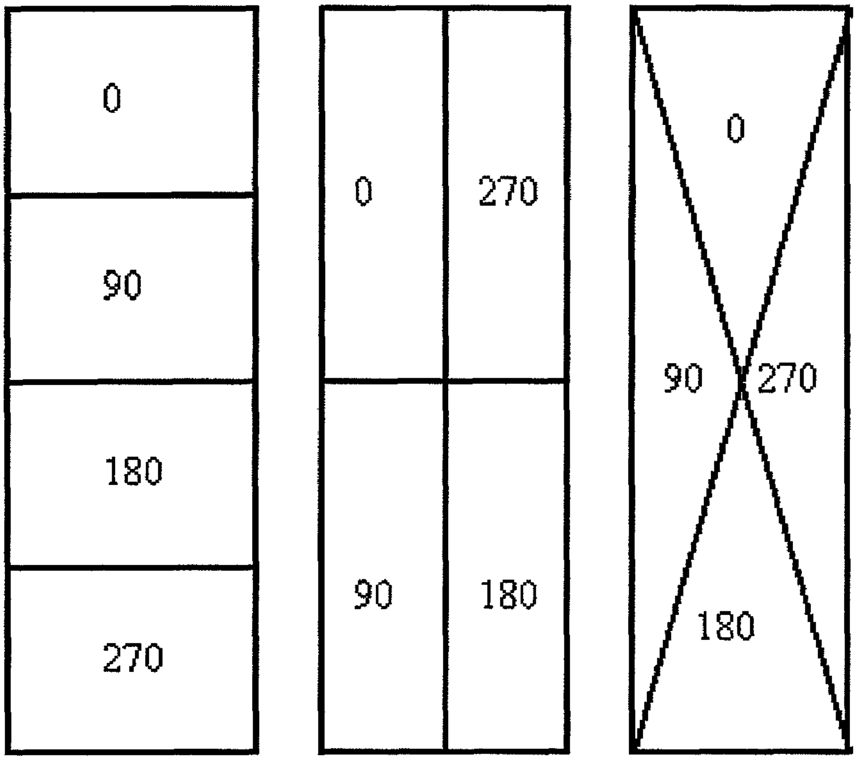
Fig. 7 (prior art)
FIG. 7 is a simplified illustration of different antenna element phasings shown in U.S. Pat. No. 6,081,238 (Alicot)
Figure 8:
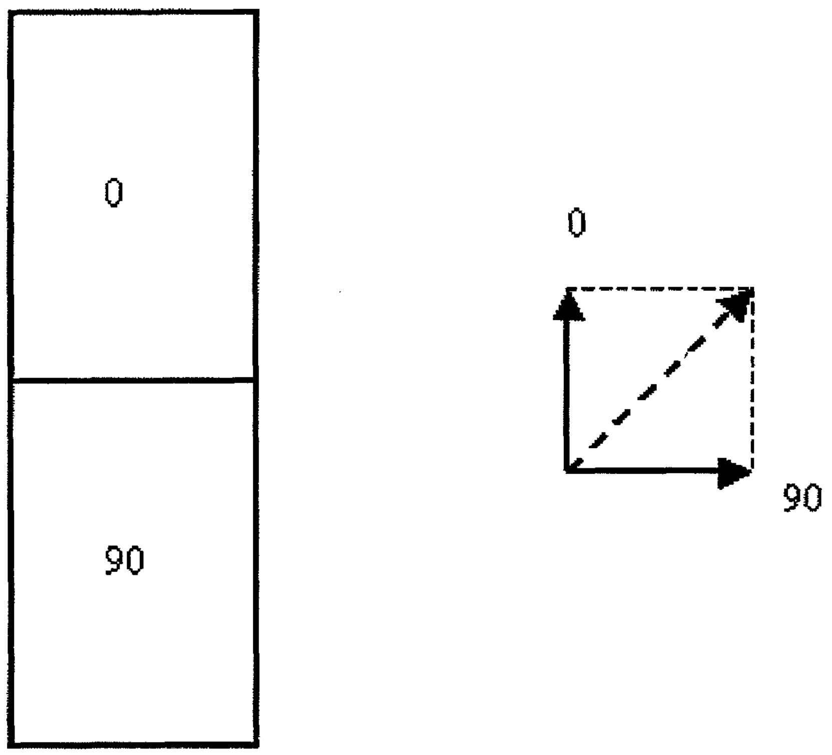
Fig. 8 (PRIOR ART)
FIG. 8 is a simplified illustration of a non-zero far-field vector summation.
Figure 9:
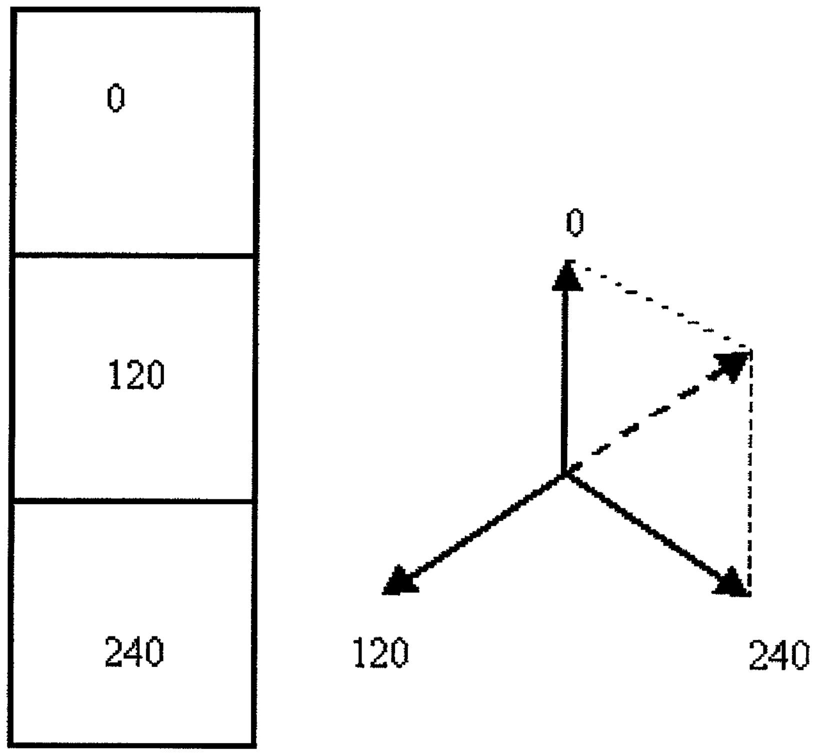
FIG. 9 is a simplified illustration of a phased method with far field cancellation of the present invention.
Figure 9A:
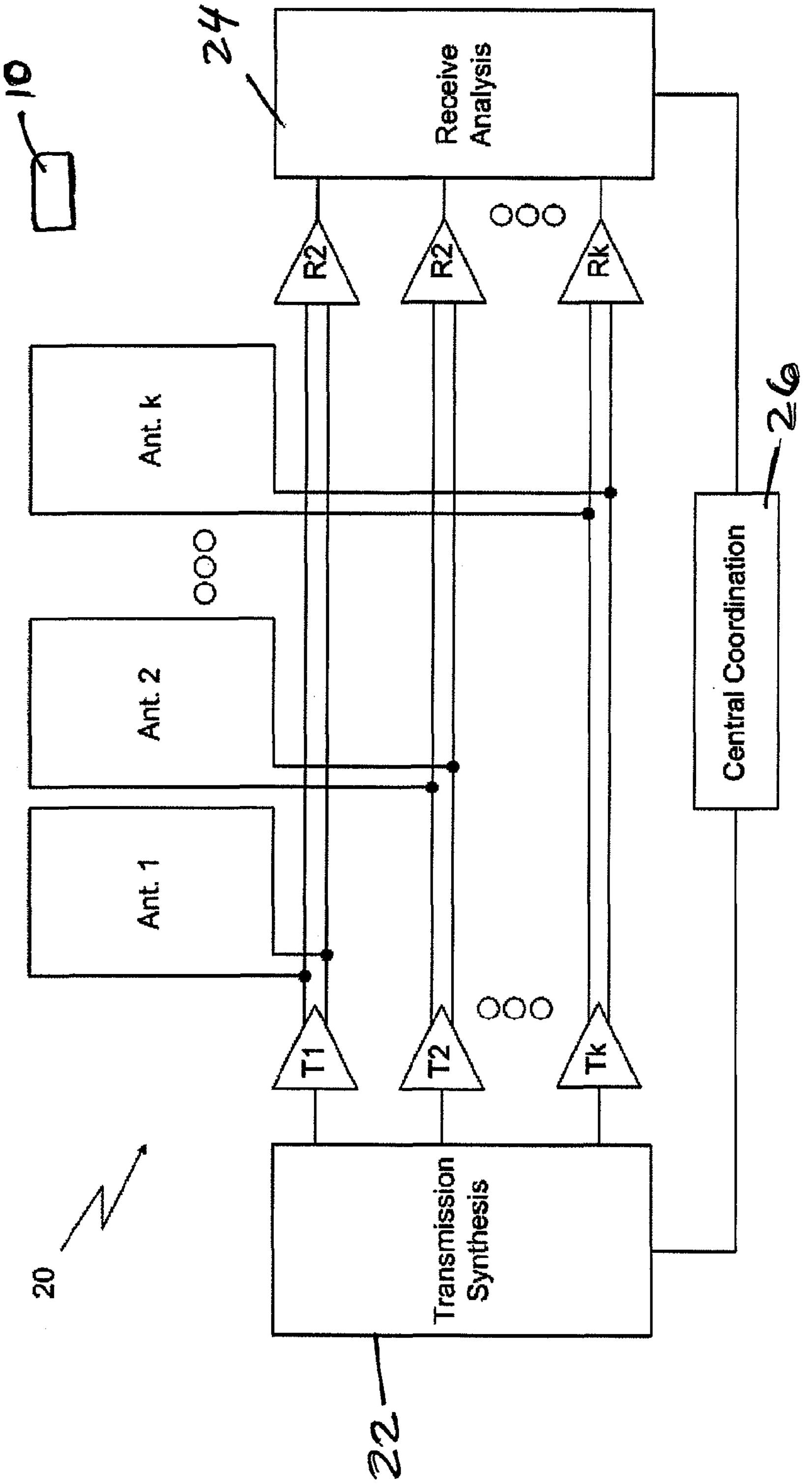
FIG. 9A depicts a block diagram of the system of the present invention.

This invention 20 (see FIG. 9A) relates to dynamically controlled electronic article surveillance (EAS) systems whereby an array of antenna elements (Ant. 1, Ant. 2, . . . Ant. K) is digitally phased and actively driven for concurrent transmission 22 and digitally phased and then combined in the receiver unit 24 to improve detection of a security tag 10. All of this is arranged from a central coordination 26 (e.g., processor). In particular, the transmit and receive interrogating field is digitally scanned such that detection may be reinforced in some desired locations and still be insensitive to tag orientation suppressed in some other locations. In one manifestation of the invention, active phasing of multiple antenna elements for concurrent transmission is performed digitally using a direct digital synthesizer (DDS).

Figure 10:
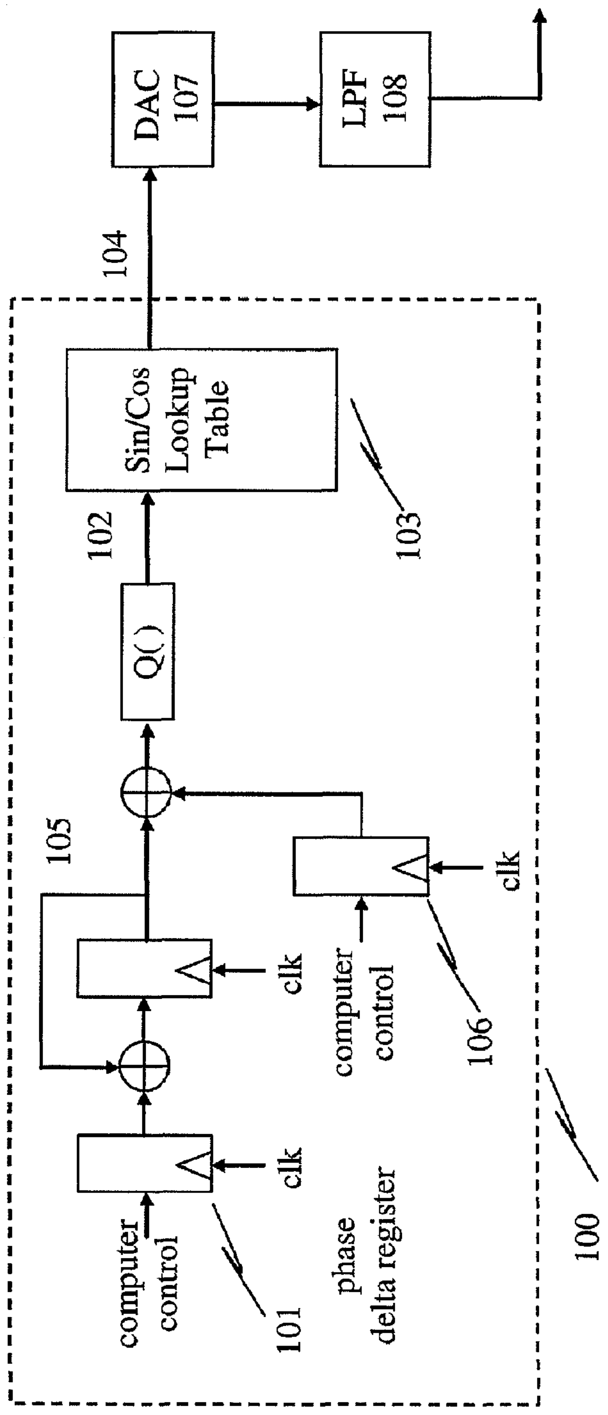
FIG. 10 is a high-level view of the direct digital synthesizer according to the present invention.

FIG. 10 shows a high-level view of the DDS 100. A phase delta 101 controlling the output frequency is accumulated (i.e., digitally-integrated in time) and quantized to generate an index 102 that is mapped by the sine/cosine lookup table 103 to generate the output RF waveform 104. After the phase accumulation 105, a desired phase offset 106 is added to the result prior to quantization. The phase delta and phase offset can be set or changed dynamically in terms of cycles per sample over a wide range of the RF spectrum.

For example, a phase delta of one tenth (1/10) and a phase offset of one hundredth (1/100) implies that in 10 time samples, one sinusoid is completed with a phase shift of 360/100 degrees. The DDS output is then presented to a digital-to-analog converter (DAC) 107 and a low-pass filter 108 to yield the analog, transmit waveform. Different phase offset registers are used, one for each antenna element, to produce a digital phasing network such that the same lookup table can be time-division multiplexed to produce a plurality of RF waveforms. Furthermore, with the availability of both the sine and cosine outputs from the same lookup table, a pair of transmit signals are readily generated with a phase separation of 90°.

Figure 11:
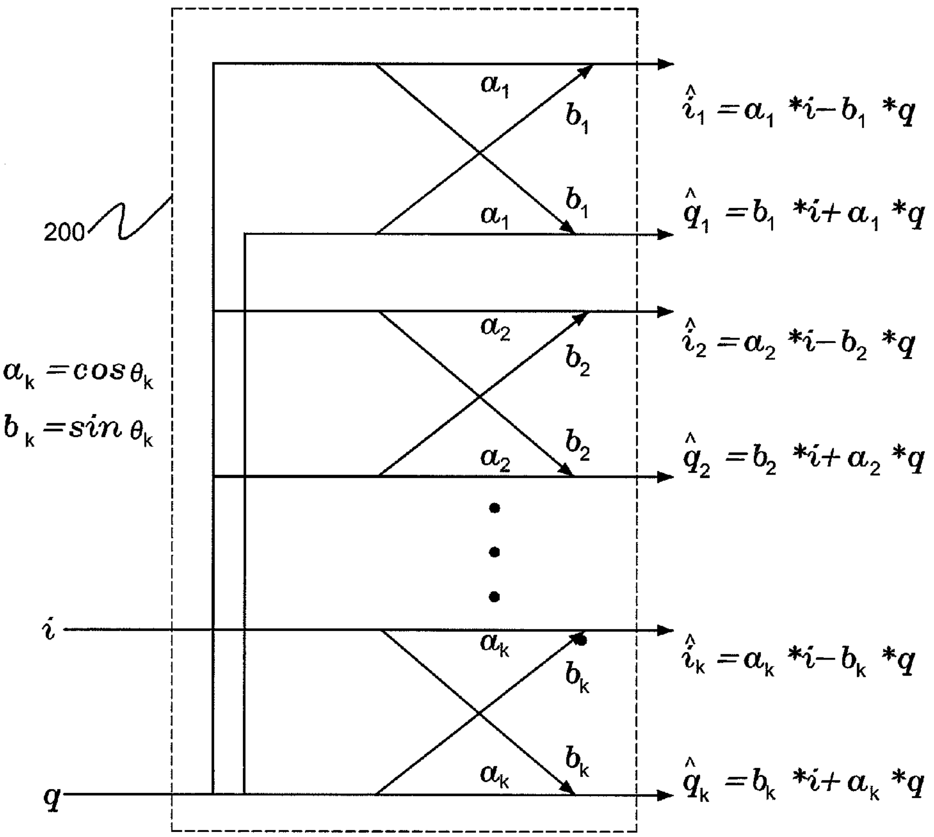
FIG. 11 is a digital phase shift network according to the present invention.

In another manifestation of the invention, active phasing of multiple antenna elements for concurrent transmission is performed using a digital phase-shift, up-convert network. A template in-phase (I) and quadrature (Q) baseband signal is first designed and presented to a digital phase shift network followed by a digital up-converter (DUC). FIG. 11 shows a digital phase shift network 200 obtained using a network of multipliers and adders to perform a plurality of vector rotations according to the rotation matrix $$\begin{bmatrix} \hat{i}_k \\ \hat{q}_k \end{bmatrix} = \begin{bmatrix} \cos\theta_k & \sin\theta_k \\ -\sin\theta_k & \cos\theta_k \end{bmatrix} \begin{bmatrix} i \\ q \end{bmatrix}$$

where [i, q] represents the template I/Q waveform, $[\hat{i}_k, \hat{q}_k]$ represents the rotated waveform for antenna element k, and $\theta_k$ represents the phase shift for antenna element k.

Figure 12:
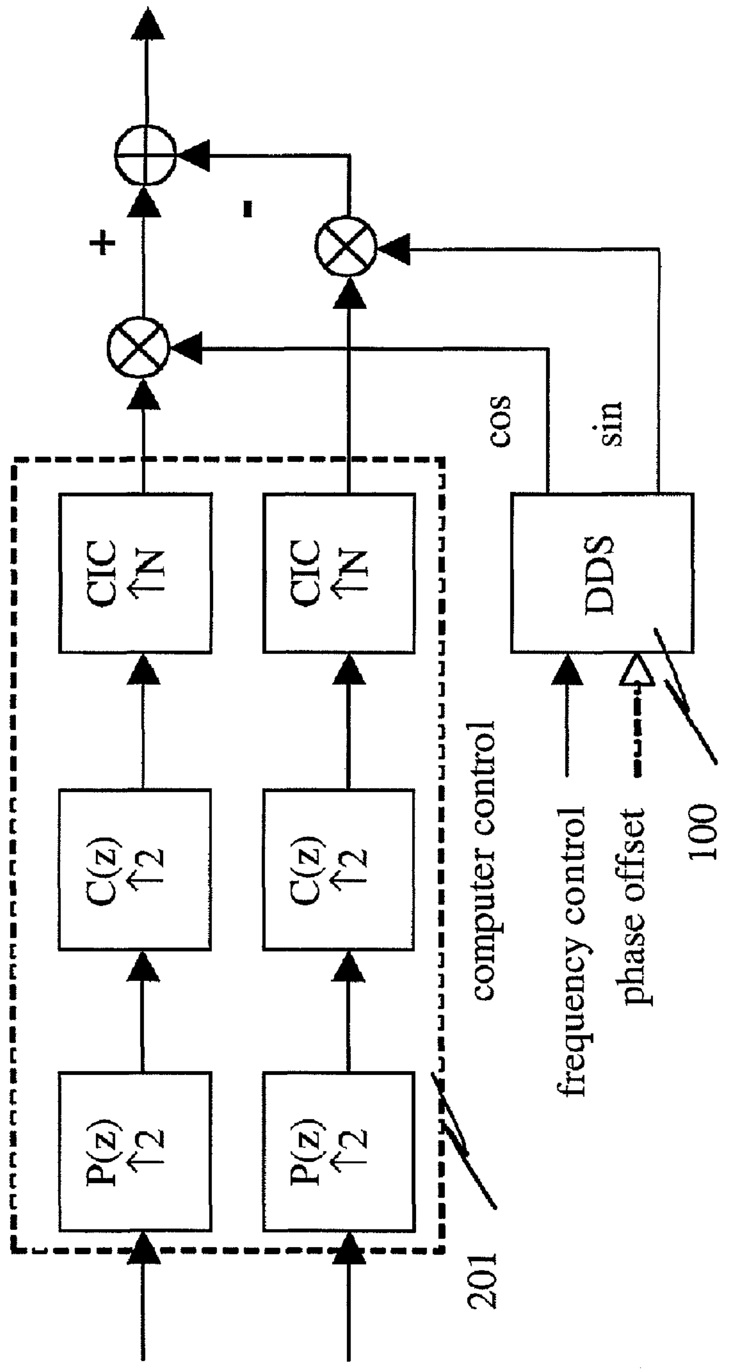
FIG. 12 is a digital up-converter according to the present invention.

FIG. 12 shows a phased shifted output being up-converted in frequency using the cascade integrator comb (CIC) up-sampling filter 201 and the DDS 100. The final up-converted signal is given according to:

$$s_k(n)=\tilde{x}_k(n)\cos(\omega_0 n)-\tilde{y}_k(n)\sin(\omega_0 n)$$

where $[\tilde{x}_k, \tilde{y}_k]$ represents the CIC output for antenna element k $[\cos(\omega_0 n)\sin(\omega_0 n)]$ represents the DDS output, and $\omega_0$ represents the desired angular frequency of the RF waveform.

The same DDS is employed to perform the frequency up shifting for all of the transmit antenna elements. Unlike an analog phase-shift network that is appropriate for use only at a single (or narrowband) frequency, the same digital phase shift network 200 (of FIG. 11) can be used over a wide range of the RF spectrum simply by adjusting the DDS's phase delta.

Figure 13:
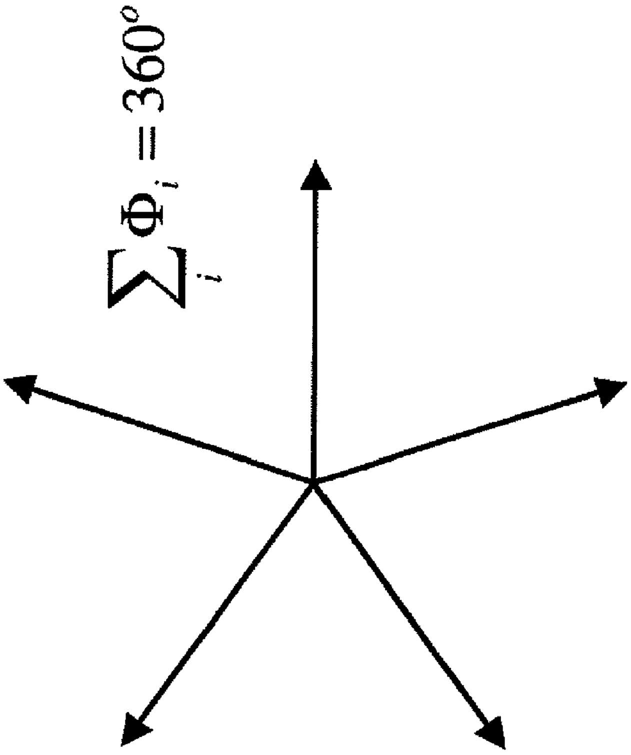
FIG. 13 is the constrained vector summation for substantial far-field suppression.

In another facet of the invention, to achieve substantial far-field suppression for regulatory compliance, the vector summation of the plurality of phase shift employed to drive the transmit antenna array must equal zero in the far field. The choice of phase shifts employed to drive the transmit antenna array is crucial not only to the pattern of the interrogating field generated, but also to the field strength far away from the antenna. In order that the far-field energy is suppressed for regulatory purposes, a constraint is imposed here as shown in FIG. 13 such that substantial far-field suppression is achieved regardless of the antenna structure and the number of antenna elements present in the system. For example, in a system with three identical antenna elements, if two of the phase shifts were 0° and 120°, then it would be desirable to choose a phase shift of 240° for the third antenna element such that the vector sum of all phase shifts equals zero.

Figure 14:
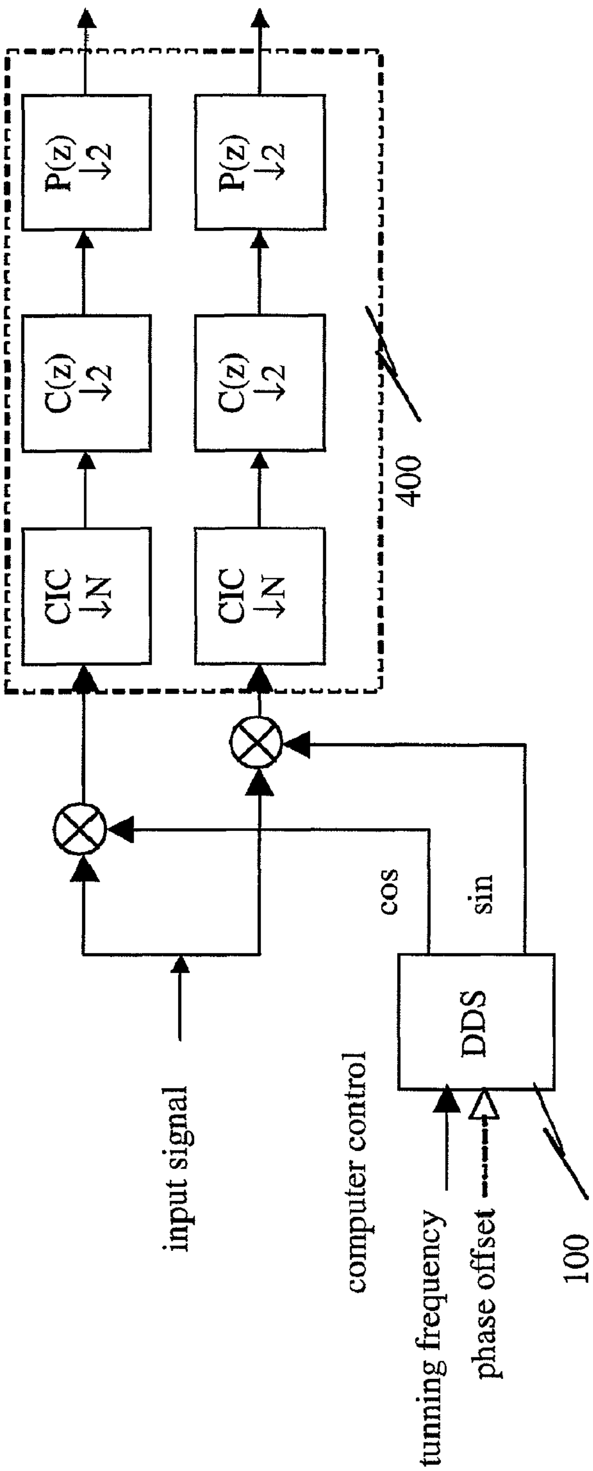
FIG. 14 shows the received signals being digitally processed using a down-convert; phase-shift network.

For another facet of the invention, the plurality of RF/IF receive signals from the antenna array are digitally processed using a down-convert, phase-shift network. The received RF signal for each antenna is presented to a digital down-converter (DDC) followed by a digital phase shifter. FIG. 14 shows a received RF signal being down-converted in frequency using the DDS 100 and the CIC down sampling filter 400. The frequency down-converted output corresponds to the baseband I/Q signal in a reverse fashion to operations in the transmit mode. The same DDS and digital phase shift network used during the transmit mode are employed in the receive mode to perform the frequency down shifting and phase shifting for all of the receive antenna elements.

Figure 15:
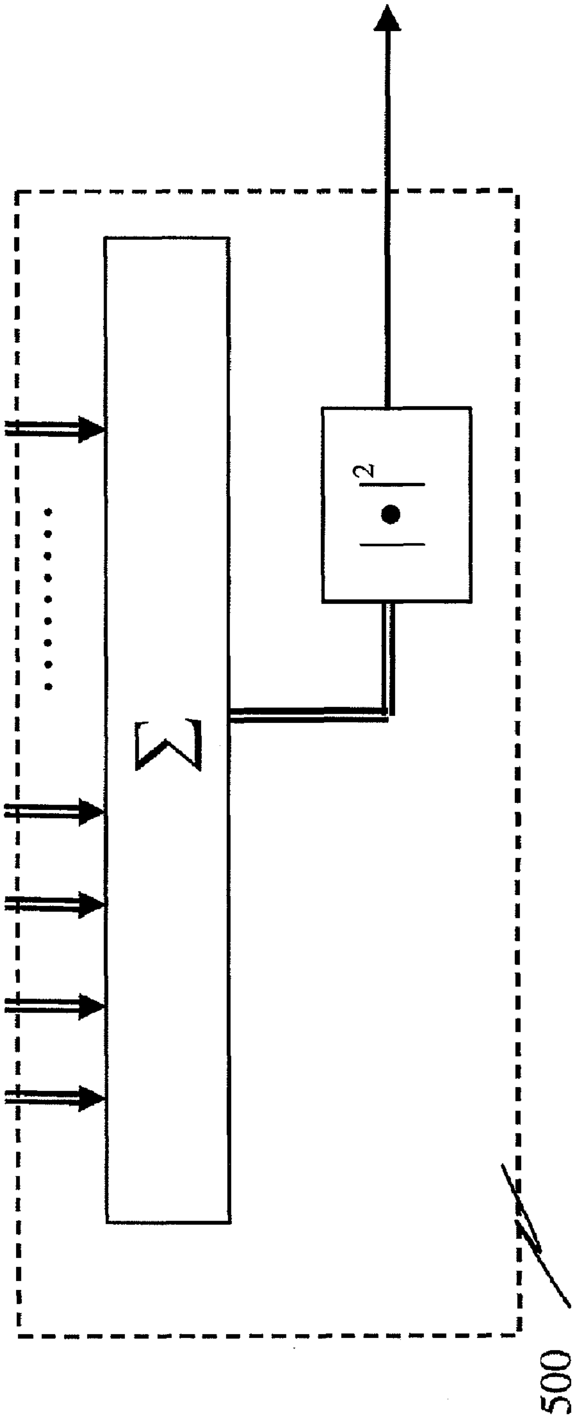
FIG. 15 is a block diagram for generating of a new composite signal computed as the square-of-sum of data for a plurality of receive antennas.

For tag detection, a composite receive signal is derived by combining the plurality of down-converted, phase-shifted, receive signals using a coherent envelope detector that performs the square-of-sum operation. FIG. 15 shows a block diagram for the generation of a new composite signal computed as the square-of-sum 500 of data for a plurality of receive antennas.

For n identical elements, the summation gives a sensitivity that is n times the sensitivity of a single element. The effect of the coherent summation is to rotate and align the I/Q-vectors from the plurality of receiving antenna elements along the same direction such that the resulting vector summation equals the magnitude sum of the induced voltage on the receiving antenna elements. By varying the choice of the rotation angles, one can adjust the spatial sensitivity or directivity of the receive field as needed to detect a resonating label at different spatial coordinate and orientation with respect to the antenna array structure. This is particularly appropriate in cases where the mutual coupling between the antenna elements must be accounted for. In addition, as the angle of flux line intersection between the emitted fields vary continuously in space, the induced voltage on the receive antennas can have a mutual phase difference that depends on the location and orientation of the tag.

Figure 16:
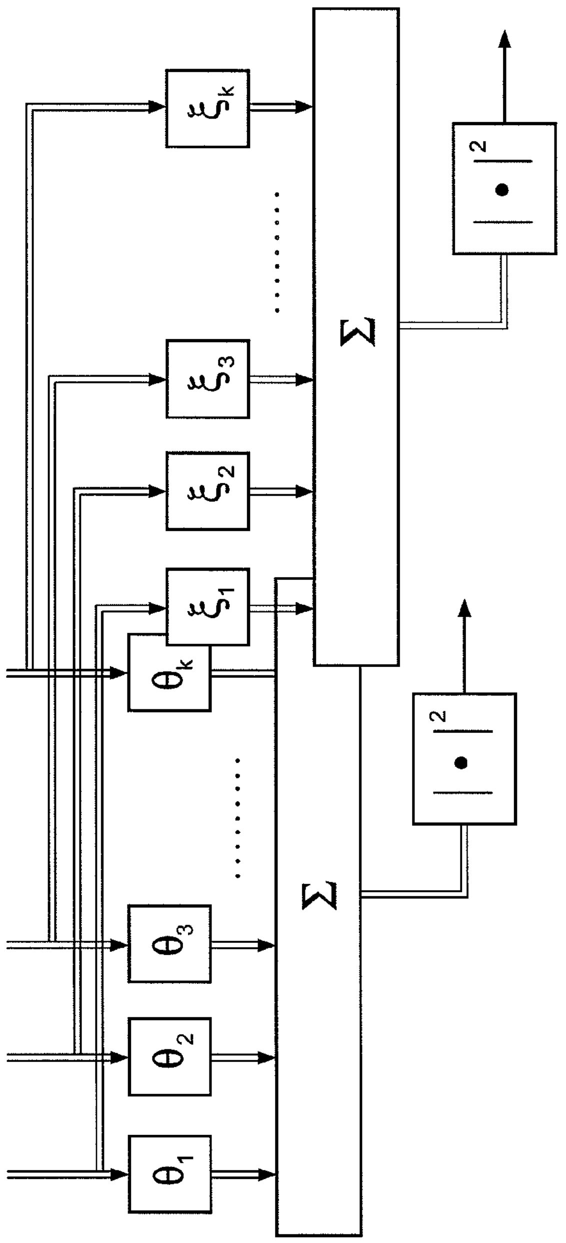
FIG. 16 shows a scheme that produces two composite receive signals derived from an array of receive antennas using two different sets of phase shifts.

The invention is also possible of creating, for tag detection, a plurality of composite receive signals derived from the many down-converted, phase-shifted, receive signals using a coherent envelope detector that performs the square-of-sum 500 operation. Because the choice of the phase shifts employed in the receive mode determines the spatial sensitivity or directivity of the receive field, different sets of phase shifts may be required to best detect a tag entering the interrogating field at different locations, especially when the signal-to-noise ratio is poor. FIG. 16 shows a scheme that produces two composite receive signals derived from an array of receive antennas using two different sets of phase shifts. The idea is that while one set of phase shifting is appropriate for the detection of a resonating tag located in a specific region, the other set is appropriate for the detection of the resonating tag located in a different region.

Figure 17:
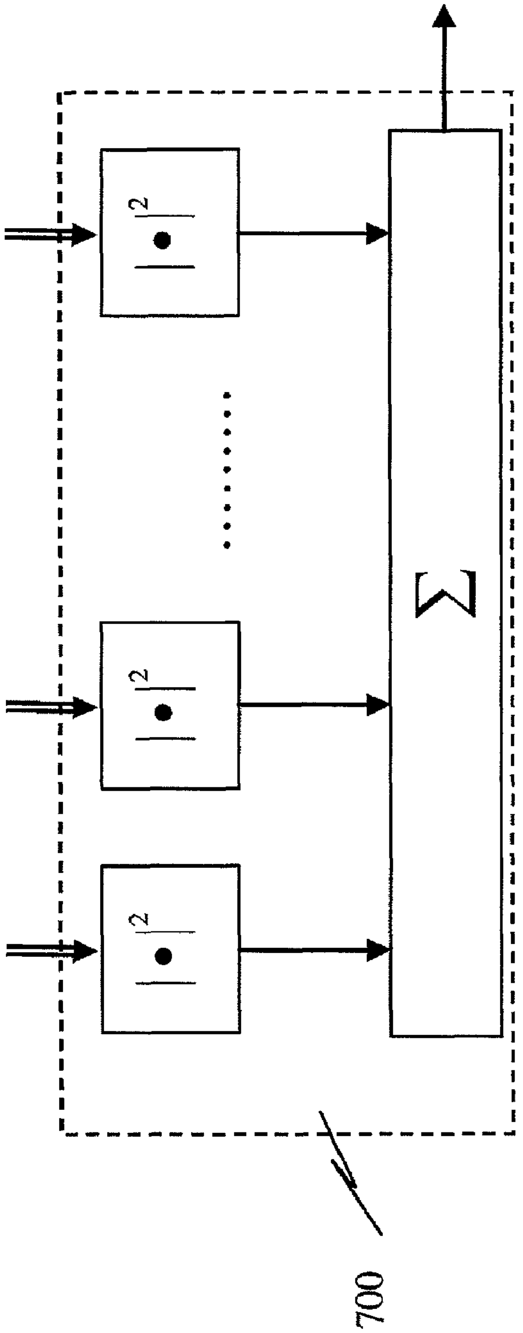
FIG. 17 shows a block diagram for generating a new composite signal computed using the sum-of-square operation on data of a plurality of receive antennas.

As another embodiment of the invention, for tag detection, a composite receive signal is derived from the plurality of down-converted signals using an incoherent envelope detector that performs the sum-of-square operation. FIG. 17 shows a block diagram for generating a new composite signal computed using the sum-of-square 700 operation on data from a plurality of receive antennas. This corresponds to having a square-law detector (envelope detector) for each antenna element and then adding the power (magnitude) from the elements to get a final signal measure. For incoherent summation, the implementation is more straightforward as compared to coherent summation but the sensitivity being $\sqrt{n}$, is somewhat less optimum compared to n for coherent summation.

Figure 18:
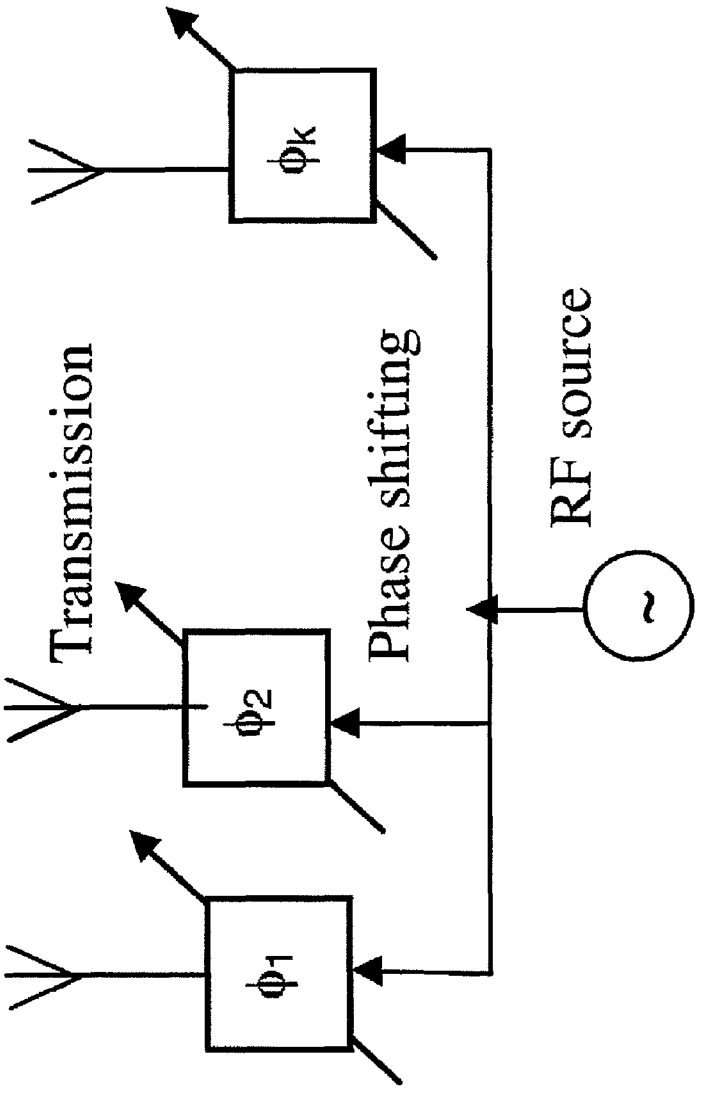
FIG. 18 shows a block diagram whereby an array of antenna elements is dynamically phased and actively driven for concurrent transmission.

The individual frequency and phase of the plurality of transmit signals are dynamically altered to allow for automated manipulation (steering) of the transmit field pattern. With the use of high-speed computer control (microcontroller, microprocessor, FPGA, etc) and a phased array antenna system, the transmit field pattern can be rapidly scanned by controlling the phasing and excitation of the individual antenna element. FIG. 18 shows a block diagram whereby an array of antenna elements is dynamically phased and actively driven for concurrent transmission. A digitally controlled array antenna can give EAS the flexibility needed to adapt and perform in ways best suited for tag detection for the particular retail store environment. Furthermore, frequency scanning is made possible with the frequency of transmission changing at will from time to time. These functions may be programmed adaptively to exercise effective automatic management such that the field pattern may be reinforced in some desired locations and suppressed in some other locations to localize the detection region.

Figure 19:
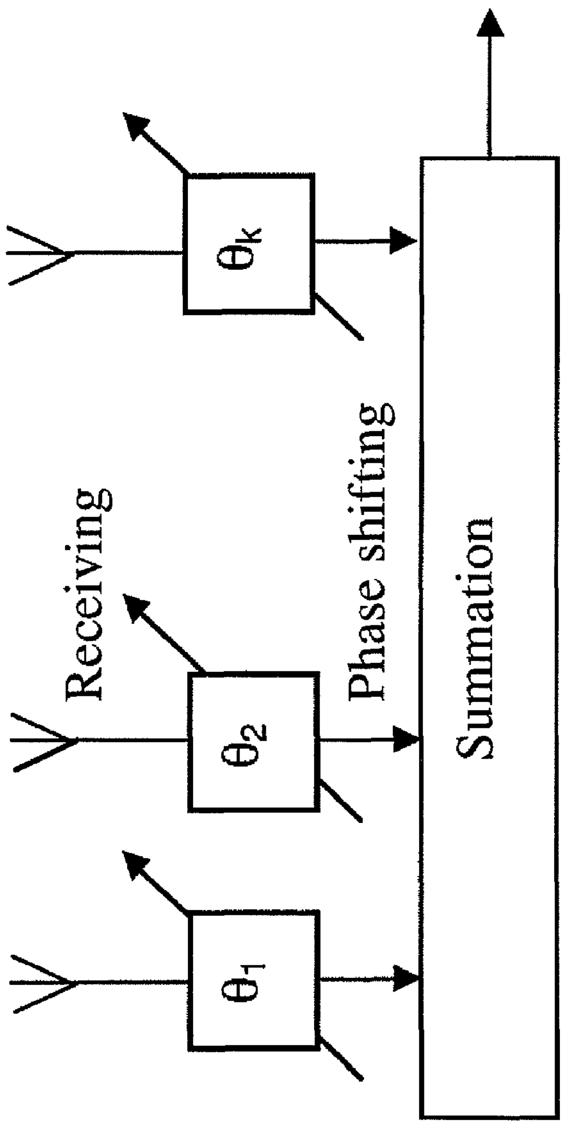
FIG. 19 shows a block diagram whereby an array of antenna elements is dynamically phased and combined in the receiver unit to improve detection.

The individual frequency and phase of the plurality of receive signals are dynamically altered to allow for automated manipulation (steering) of the receive field sensitivity. FIG. 19 shows a block diagram whereby an array of antenna elements is dynamically phased and combined in the receiver unit to improve detection. The performance of tag detection is affected by the transmit field pattern as well as the receive field sensitivity due to the law of reciprocity. In particular, for an EAS system operating in pulsed mode, a reciprocity exists between the transmit field intensity and the receive field sensitivity, in relation to the decay of field strength as distance increases. Thus, for tag detection, the dynamic phasing of the plurality of transmit signals is only effective if dynamic phasing of the plurality of receive signals is also performed.

Figure 20:
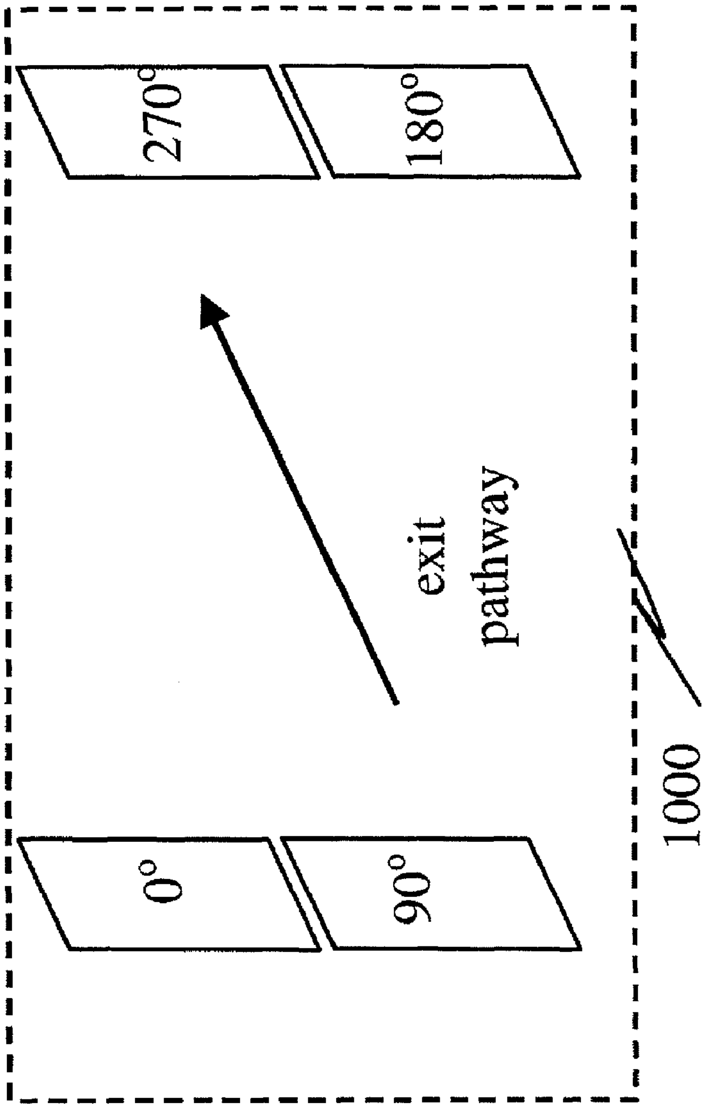
FIG. 20 illustrates a wide aisle detection scheme with dynamic phasing.

For wide aisle antenna configuration, the antenna elements are arranged to form a pedestal pair such that half of the elements having a phase shift of $0 \leq \phi_i < \pi$ are located coplanar on one side of the exit aisle while the other half of the antenna elements having a phase shift of $\pi \leq \phi_j < 2\pi$ of are located coplanar on the other side of the exit aisle. In particular, FIG. 20 shows such a scheme 1000 consisting of four antenna elements whereby the 0° and 90° loops are arranged in a common plane on one side of the exit aisle, while the 180° and the 270° loops are arranged in a common plane on the other side. Note that the sum of all the transmit phases is 360° so that the far-field emission is substantially reduced.

Figure 21:
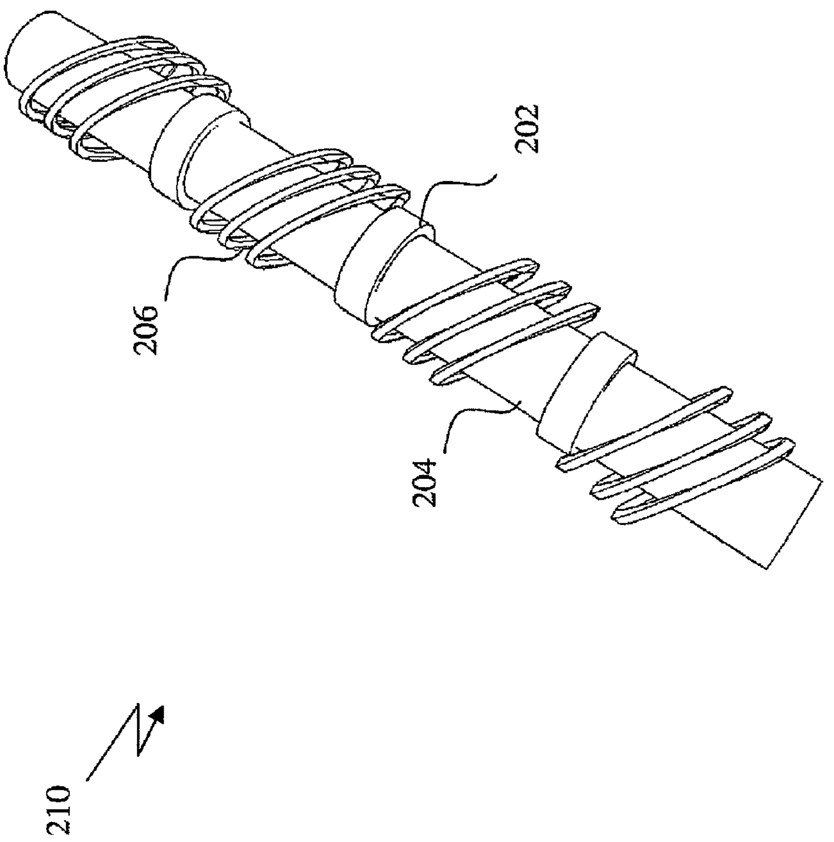
FIG. 21 depicts an exemplary antenna element comprising windings about an electromagnetic core, such as a ferrite ceramic material.

The antenna structures for the dynamic EAS system can be constructed in a variety of ways. For instance, rather than being constructed as air-loops, the antenna elements 210 may consist of windings 206 about electromagnetic cores 204, such as a ferrite ceramic material, separated by non-ferrous spacers 202, such as shown in FIG. 21. Distinct loops may share a common core or be linearly disposed on adjacent or nearly adjacent segments of material, or in a variety of other arrangements.

Figure 23:
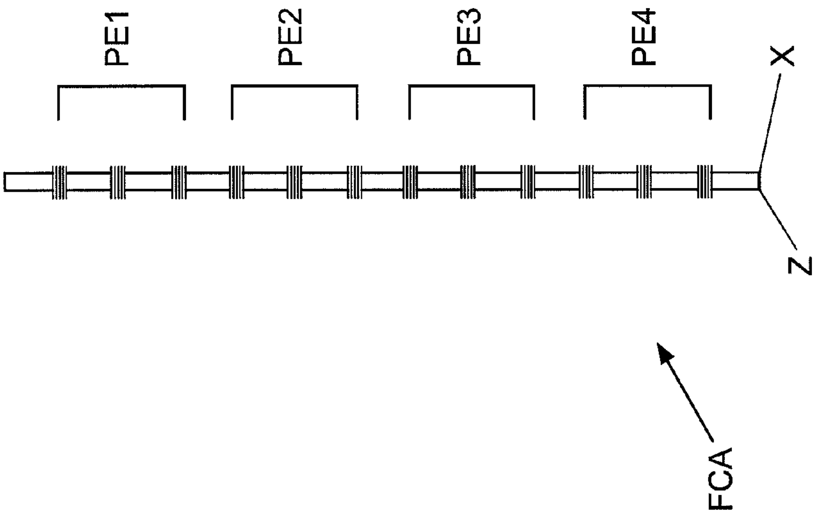
FIG. 23 depicts a side view of a ferrite core antenna of the present invention.
Figure 22:
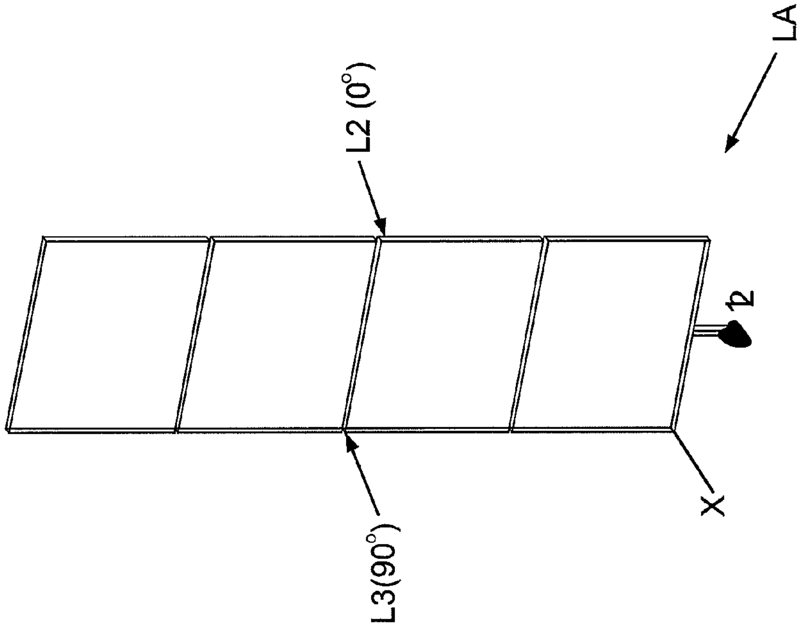
FIG. 22 depicts an isometric view of a loop antenna of the present invention.
Figure 24:
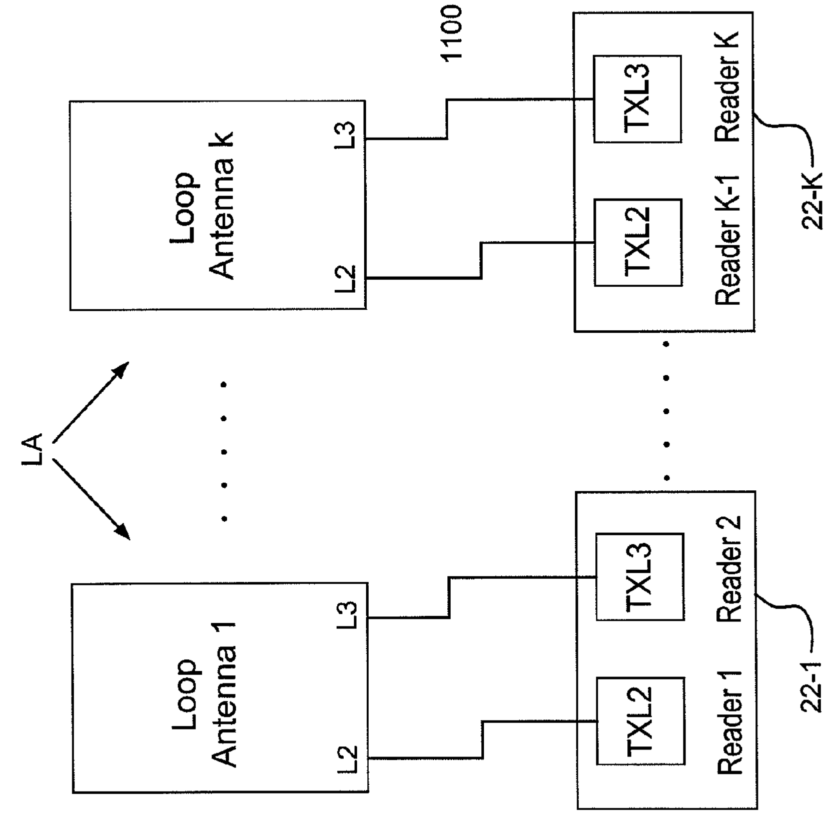
FIG. 24 is a block diagram of the reader/transmitter/driver board interface with the loop antenna.
Figure 24A:
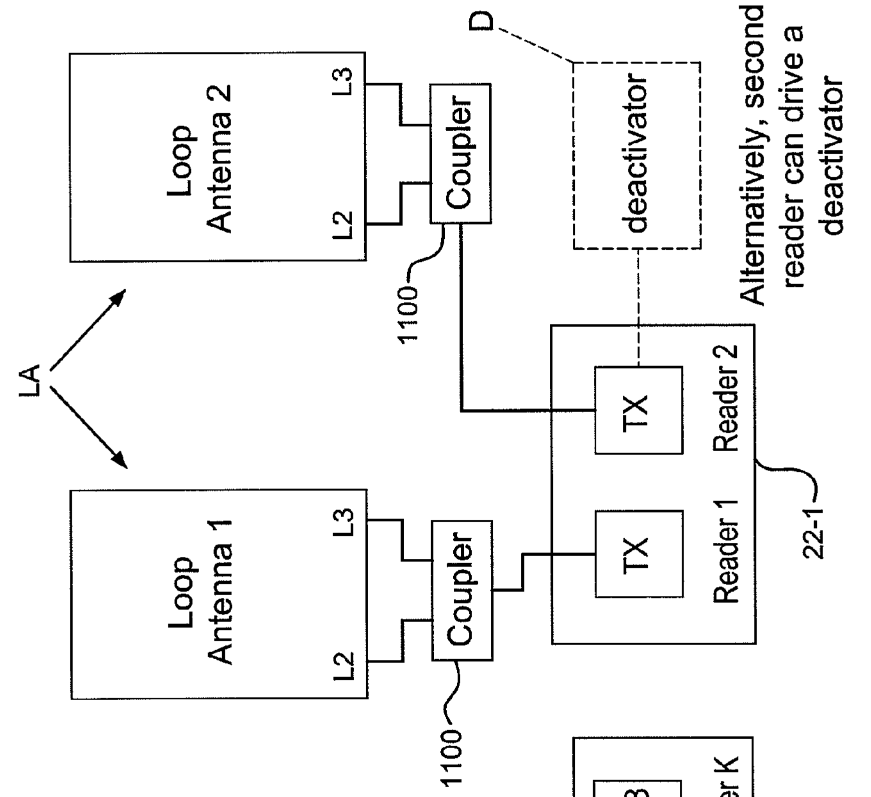
FIG. 24A is a block diagram of the reader/transmitter/driver board interface using the phase coupler of the present invention.
Figure 25A:
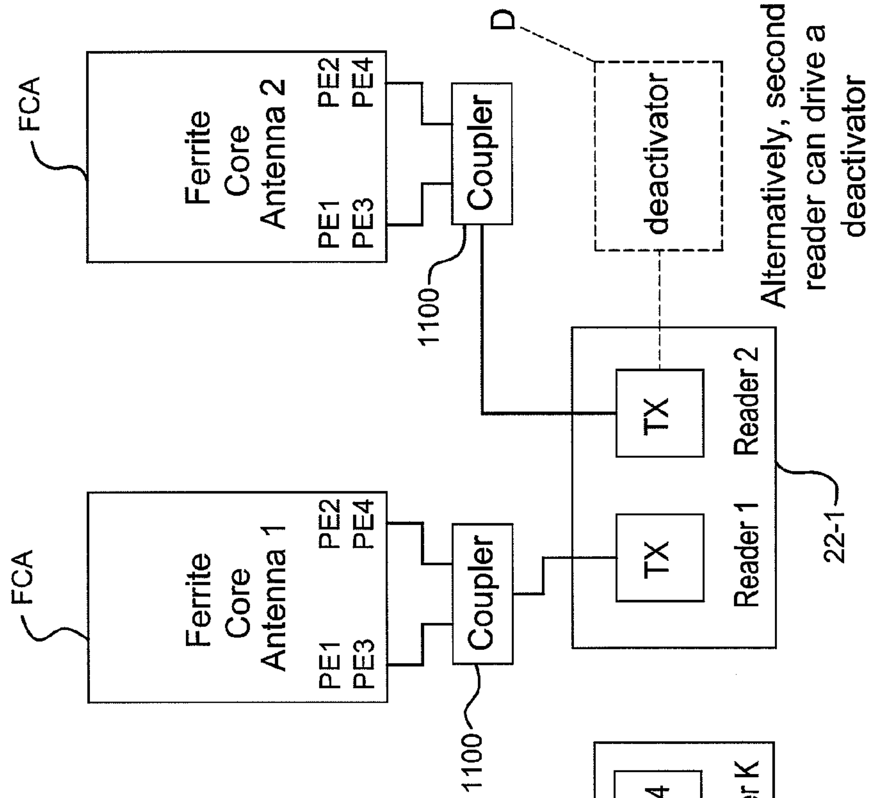
FIG. 25 is a block diagram of the reader/transmitter/driver board interface with the ferrite core antenna.
Figure 25:
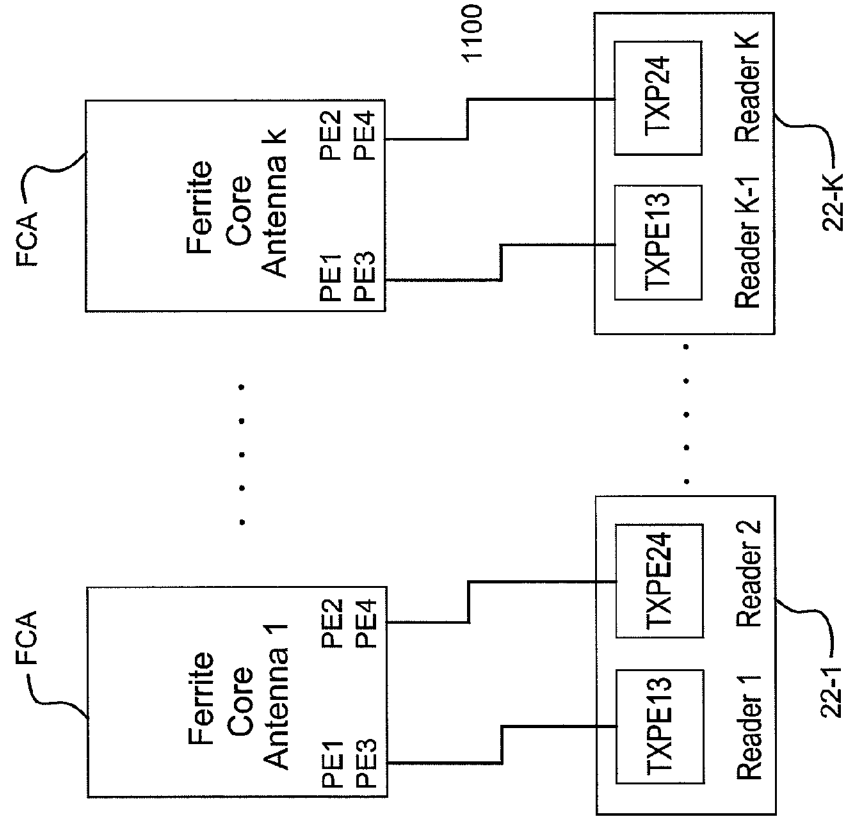

By way of example only, FIG. 22 depicts a loop antenna LA (e.g., typically used as an "in-lane" antenna) comprising a double loop L2 and a triple loop L3. FIG. 23 depicts a ferrite core antenna FCA (similar to that discussed with regard to FIG. 21) comprising, again by way of example only, four phase elements PE1-PE4 wherein PE1 and PE3 are electrically coupled together and PE2 and PE4 are electrically coupled together. In the parent application namely, A Ser. No. 12/134,827 entitled "Dynamic EAS Detection System and Method" each loop antenna LA or ferrite core antenna FCA comprises a reader/transmitter board (e.g., 22-1 through 22-K) and a dedicated reader/transmitter/driver (TXL2 and TXL3) for each loop L2 and L3 (see FIG. 24) in the loop antenna LA or a dedicated reader/transmitter/driver (TXPE13 and TXPE24) for each phase element pair PE1/PE3 and PE2/PE4 (see FIG. 25) in each ferrite core antenna FCA. The improvement of the present application eliminates the need for a dedicated reader/transmitter/driver for each component of the loop antenna LA or phase element pairs in the ferrite core antenna FCA. In particular, as shown in FIG. 24A, a phase coupler 1100 is coupled between a single reader/transmitter/driver TX and each of the loops L2 and L3 of a single antenna; similarly, as shown in FIG. 25A, a phase coupler 1100 is coupled between a single reader/transmitter/driver TX and each of the phase element pairs PE1/PE3 and PE2/PE4. The end result is that using the phase coupler 1100, permits the second reader/transmitter/driver on the reader/transmitter board (e.g., 22-1 through 22-K) to be available to either drive a second loop antenna LA or ferrite core antenna FCA via another coupler 1100. Alternatively, instead of driving a second loop antenna LA or ferrite core antenna FCA, the second reader/transmitter/driver can drive a deactivator antenna D, as shown in phantom in FIGS. 24A and 25A.

Figure 26B:
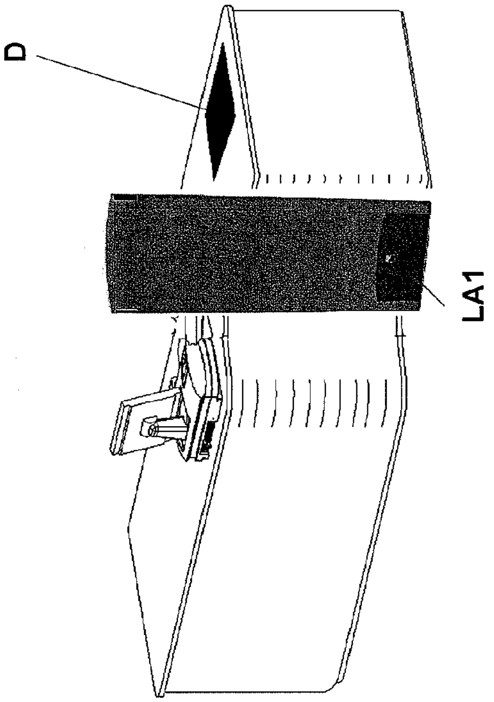
FIG. 26B is an isometric view of a portion of the system of the present application wherein a single loop antenna and a deactivator, located at a checkout station, are driven by a single reader/transmitter/driver board using the coupler of the present invention.
Figure 26A:
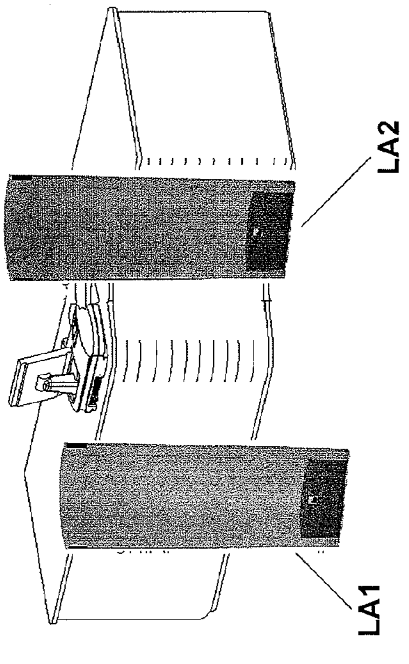
FIG. 26A is an isometric view of a portion of the system of the present application wherein two loop antennas, located at a checkout station, are driven by a single reader/transmitter/driver board using the coupler of the present invention.

FIG. 26A shows two loop antennas LA1 and LA2 at a checkout location and which are driven using the system and coupler 1100 (not shown) of the present invention. Thus, using the system and coupler 1100, dual pedestal aisle application can be controlled using a single electronics board. No synchronization cables or DC power cables need to be connected between the two pedestals. It should also be noted that the electronics boards can be localized within the pedestals or can be remotely-located. With two antenna structures controlled by one electronics board, this permits digitally-phasing the two antenna structures for detection enhancement. As a result of the foregoing, the system uses less power and is readily more adaptable and flexible for installation in more retail environments.

FIG. 26B depicts the alternative where a single loop antenna LA1 at the checkout location is driven by the system and coupler 1100 of the present invention as well as a deactivator antenna D.

Figure 27:
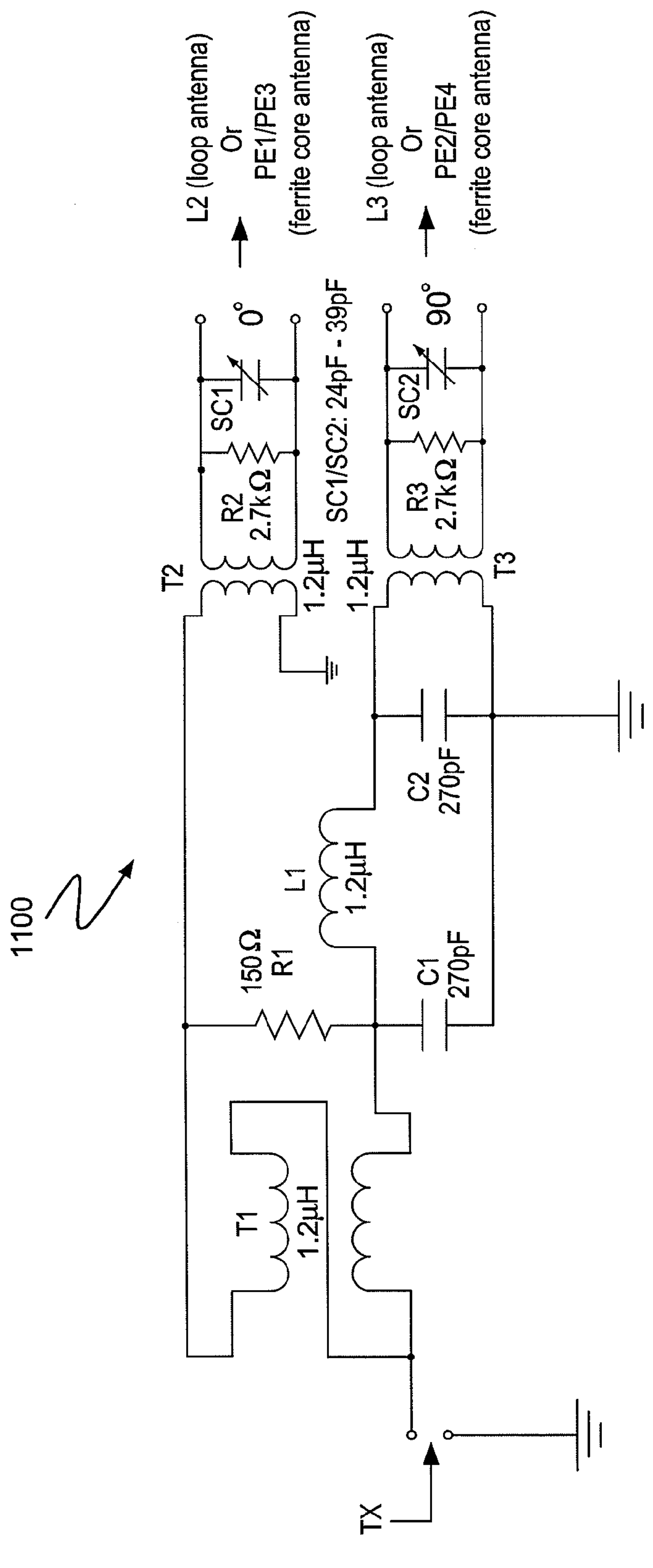
FIG. 27 is an exemplary circuit schematic of the phase coupler of the present invention.

FIG. 27 depicts a schematic of the coupler 1100 by way of example only. In particular, the coupler 1100 comprises an input from the reader/transmitter TX which is passed through a transformer T1 (e.g., 1.2 μH acts as 75 Ω at 8.2 MHz). A circuit comprising L1 and C1 and C2 acts as a power divider (50%) and a 90° phase shifter for generating the respective drive signals for L2 and L3 (or PE1/PE3 and PE2/PE4) and both of which form inductively coupled outputs via T2 and T3 for proper isolation. The shunt capacitors SC1/SC2 are tunable for different antennas and therefore can vary in the range of 24 pF to 39 pF. Thus, both the amplitude and phase of the driver signals can be tuned for optimal near field detection and far field cancellation.

While the invention has been described in detail and with reference to specific examples thereof, it will be apparent to one skilled in the art that various changes and modifications can be made therein without departing from the spirit and scope thereof.

What is claimed is:

1. An electronic article surveillance system comprising:

a plurality of antenna structures, each antenna structure including three or more loops and wherein each antenna structure is connected to a single transmission driver, for generating respective electromagnetic fields from each antenna structure, and wherein said single transmission driver is arranged to drive said loops of said antenna structure in such a way that the vector sum of said electromagnetic fields of said antenna structures is null in a far field and wherein no vector is separated by another vector by 180° of phase;

a plurality of electronics boards and wherein each electronics board has two independent transmission drivers thereon, and wherein one of said transmission drivers drives a first antenna structure and wherein the other one of said transmission drivers drives a second antenna structure; and wherein each of said antenna structures is coupled to said single transmission driver via a phase coupler, said phase coupler converting a transmission driver signal into two distinct phase driver signals for driving a first set of loops and a second set of loops for an antenna structure.

2. The electronic article surveillance system of claim 1 wherein one of said two distinct phase driver signals has a phase of 0° and the other one of said phase driver signals has a phase of 90°.

3. The electronic article surveillance system of claim 1 wherein each of said two distinct phase driver signals are one-half the power of said transmission driver signal.

4. The electronic article surveillance system of claim 1 wherein said other one of said transmission drivers also drives a deactivator antenna.

5. An electronic article surveillance system comprising:

a plurality of antenna structures, each antenna structure including three or more loops which are wound around an electromagnetic core structure and wherein each antenna structure is connected to a single transmission driver, for generating respective electromagnetic fields from each antenna structure, and wherein said single transmission driver is arranged to drive said loops wound around said electromagnetic core structure of said antenna structure in such a way that the vector sum of said electromagnetic fields of said antenna structures is null in a far field and wherein no vector is separated from another by 180° of phase;

a plurality of electronics boards and wherein each electronics board has two independent transmission drivers thereon, and wherein one of said transmission drivers drives a first antenna structure and wherein the other one of said transmission drivers drives a second antenna structure; and wherein each antenna structure is coupled to said single transmission driver via a phase coupler, said phase coupler converting a transmission driver signal into two distinct phase driver signals for driving a first set of loops and a second set of loops for each antenna structure.

6. The electronic article surveillance system of claim 5 wherein said electromagnetic core comprises either ferrite ceramic material or a composite ferrous and insulating material to form a ferrite core antenna.

7. The electronic article surveillance system of claim 5 wherein one of said two distinct phase driver signals has a phase of 0° and the other one of said phase driver signals has a phase of 90°.

8. The electronic article surveillance system of claim 5 wherein each of said two distinct phase driver signals are one-half the power of said transmission driver signal.

9. The electronic article surveillance system of claim 5 wherein the other one of said transmission drivers also drives a deactivator antenna.

10. The electronic article surveillance system of claim 1 wherein said first antenna structure is coupled to a first single transmission driver via a first phase coupler and a second antenna structure is coupled to a second single transmission driver via a second phase coupler, said first phase coupler converting a first transmission driver signal into a first set of two distinct phase driver signals for driving a first set of loops and a second set of loops for said first antenna structure, and said second phase coupler converting a second transmission driver signal into a second set of two distinct phase driver signals for driving a third set of loops and a fourth set of loops for said second antenna structure, wherein the phase difference between one of said first set of two distinct phase driver signals and other one of said first set of two distinct, phase driver signals is 90 degrees and wherein the phase difference between one of said second set of two distinct phase driver signals and other one of said second set of two distinct phase driver signals is 90 degrees, and wherein the sum of all phase driver signals from said first set of two distinct phase driver signals and said second set of two distinct phase driver signals is 360 degrees.

11. The electronic article surveillance system of claim 10 wherein said first set of loops and said second set of loops are arranged in a first common plane to form a first pedestal and said third set of loops and said fourth set of loops are arranged in a second common plane to form a second pedestal, wherein said first pedestal and said second pedestal are each located on a respective side of an aisle.

* * * * *